(12) United States Patent
Smith et al.

(10) Patent No.: US 12,519,797 B2
(45) Date of Patent: **\*Jan. 6, 2026**

(54) SECURE ACCESS SERVICE EDGE (SASE)

(71) Applicant: Level 3 Communications, LLC, Broomfield, CO (US)

(72) Inventors: Christopher D. Smith, Broomfield, CO (US); Gurpreet S. Sidhu, Aurora, CO (US); Darren N. Wolner, Ashburn, VA (US); Michael F. Robles, Arvada, CO (US); Nanette B. Zeile, Superior, CO (US); Mark Thomas Johnson, Lakewood, CO (US); David Scott Adler, Edmond, OK (US); Mark Alan Ramach, Seattle, WA (US); Priyadarshini Dande, Thornton, CO (US)

(73) Assignee: Level 3 Communications, LLC, Denver, CO (US)

( * ) Notice: Subject to any disclaimer, the term of this patent is extended or adjusted under 35 U.S.C. 154(b) by 309 days.

This patent is subject to a terminal disclaimer.

(21) Appl. No.: 18/302,245

(22) Filed: Apr. 18, 2023

(65) Prior Publication Data

US 2023/0403282 A1 Dec. 14, 2023

Related U.S. Application Data

(60) Provisional application No. 63/401,461, filed on Aug. 26, 2022, provisional application No. 63/351,612, filed on Jun. 13, 2022.

(51) Int. Cl.
*H04L 9/40* (2022.01)

(52) U.S. Cl.
CPC .................................. *H04L 63/102* (2013.01)

(58) Field of Classification Search
CPC ....................................................... H04L 63/102
See application file for complete search history.

(56) References Cited

U.S. PATENT DOCUMENTS

| 11,153,155 B1* | 10/2021 | Perez | H04L 41/0809 |
| 2019/0199597 A1* | 6/2019 | Valisammagari | H04L 41/14 |
| 2022/0103597 A1* | 3/2022 | Gobena | H04L 63/205 |

\* cited by examiner

*Primary Examiner* — Noura Zoubair

(57) ABSTRACT

Novel tools and techniques are provided for implementing network service ordering and provisioning of secure access service edge ("SASE") software packages. In various embodiments, a computing system may provide a user experience ("UX") platform for a customer portal, the UX platform being accessible by a user via a user device over a first network(s); may provide, via the UX platform, options to configure, via the customer portal, one or more SASE-based network services among a plurality of network services provided by a service provider; and may autonomously orchestrate deployment and configuration of the one or more SASE-based network services via one or more customer premises equipment ("CPE") that are associated with the user or to an entity with which the user is associated, over a second network(s), based at least in part on user selection of at least one option to configure the one or more SASE-based network services.

17 Claims, 8 Drawing Sheets

SECURE ACCESS SERVICE EDGE (SASE)

CROSS-REFERENCES TO RELATED APPLICATIONS

This application claims priority to U.S. Patent Application Ser. No. 63/351,612 (the "'612 Application"), filed Jun. 13, 2022, by Christopher D. Smith et al., entitled, "Secure Access Service Edge ("SASE")," and U.S. Patent Application Ser. No. 63/401,461 (the "'461 Application"), filed Aug. 26, 2022, by Christopher D. Smith et al., entitled, "Secure Access Service Edge ("SASE")," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network service ordering and provisioning, and, more particularly, to methods, systems, and apparatuses for implementing network service ordering and provisioning of secure access service edge ("SASE") services or software packages.

BACKGROUND

Secure access service edge ("SASE") recently proposed by Gartner, Inc., promises benefits from future implementation. Although some companies have begun to implement some of the ideas underlying Gartner's SASE to address issues with conventional siloed network solutions, such nascent attempts fail to provide customers with the ability to purchase SASE-based network services nor the ability to preconfigure such SASE-based network services, and fail to enable autonomous deployment of such preconfigured SASE-based network services.

Hence, there is a need for more robust and scalable solutions for implementing network service ordering and provisioning of secure access service edge ("SASE") services or software packages.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

DETAILED DESCRIPTION OF CERTAIN EMBODIMENTS

Overview

Figure 1:
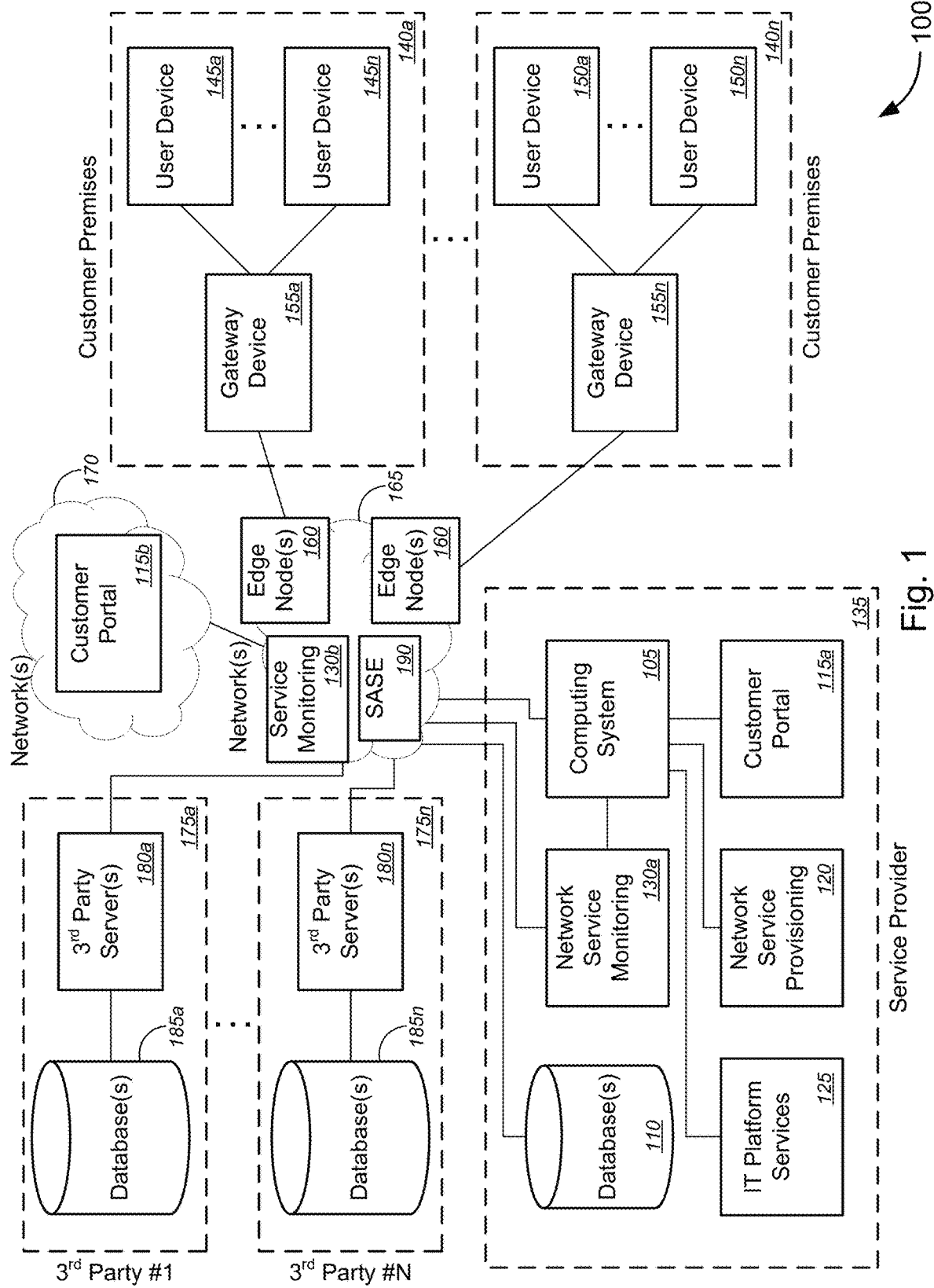
FIG. 1 is a schematic diagram illustrating a system for implementing a customer portal for providing a user experience ("UX") for customers to order and configure secure access service edge ("SASE")-based network services or software packages that are subsequently autonomously provisioned via a network(s) and autonomously configured, in accordance with various embodiments.

Various embodiments provide tools and techniques for implementing network service ordering and provisioning of secure access service edge ("SASE") services or software packages.

In various embodiments, a customer portal is provided for providing a UX for customers to order and configure SASE-based network services that are subsequently autonomously provisioned via a network(s), in some cases, autonomously deploying, on customer premises equipment ("CPE"), purchased SASE-based network services that have been preconfigured. In some embodiments, a SASE manager may configure such network services either before installation of the CPE or after installation of the CPE, or the like.

These and other aspects of the network service ordering and provisioning of secure access service edge ("SASE") services or software packages are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise providing, using a computing system, a user experience ("UX") platform for a customer portal, the UX platform being accessible by a user via a user device over one or more first networks; providing, using the computing system and via the UX platform, one or more options to configure, via the customer portal, one or more secure access service edge ("SASE")-based network services among a plurality of network services provided by a service provider, the one or more SASE-based network services collectively comprising a set of unified, cloud-based services that integrate software-defined wide area network ("SD-WAN") functionalities with network service functionalities and network security functionalities; and autonomously orchestrating, using the computing system, deployment and configuration of the one or more SASE-based network services via one or more customer premises equipment ("CPE") that are associated with the user or to an entity with which the user is associated, over one or more second networks, based at least in part on user selection of at least one option among the one or more options to configure the one or more SASE-based network services.

In some embodiments, the computing system may comprise at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like. In some cases, each of the one or more CPE may be located at a customer premises, the customer premises comprising one of a residential customer premises, a business customer premises, a corporate customer premises, an enterprise customer premises, an education facility customer premises, a medical facility customer premises, or a governmental customer premises, and/or the like. In some instances, at least one of the one or more second networks may be the same network as at least one of the one or more first networks.

According to some embodiments, the plurality of network services may comprise at least one of the one or more SASE-based network services, a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may comprise at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities may comprise at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like.

In some embodiments, the user selection of the at least one option among the one or more options to configure the one or more SASE-based network services may comprise user selection of one or more first options to preconfigure the one or more SASE-based network services with at least one configuration among a plurality of configurations of the one or more SASE-based network services and/or to preconfigure the one or more CPE with the preconfigured one or more SASE-based network services, each prior to delivery and/or installation of the one or more CPE at one or more customer premises associated with the entity. In such cases, deployment and configuration of the one or more SASE-based network services may comprise: prior to delivery and installation of a CPE among the one or more CPE at a customer premises among the one or more customer premises associated with the entity, preconfiguring the one or more SASE-based network services with at least one configuration among a plurality of configurations of the one or more SASE-based network services and/or preconfiguring the CPE with the preconfigured one or more SASE-based network services; in response to the CPE being installed at the customer premises, autonomously establishing, using the CPE, a connection with a server over the one or more second networks; and in response to establishing the connection with the server, autonomously activating, using the CPE, the one or more SASE-based network services based at least in part on the at least one configuration with which the one or more SASE-based network services have been preconfigured.

Alternatively, the user selection of the at least one option among the one or more options to configure the one or more SASE-based network services may comprise user selection of one or more second options to configure the one or more SASE-based network services with at least one configuration among a plurality of configurations of the one or more SASE-based network services and/or to configure the one or more CPE with the one or more SASE-based network services, each after the one or more CPE have already been installed at one or more customer premises associated with the entity. In such cases, deployment and configuration of the one or more SASE-based network services may comprise, after installation of a CPE among the one or more CPE at a customer premises among the one or more customer premises associated with the entity, performing one of: pushing the one or more SASE-based network services onto the CPE, installing the one or more SASE-based network services onto the CPE, and configuring the one or more SASE-based network services; or pushing and installing the one or more SASE-based network services, which have been pre-configured, onto the CPE; or the like.

According to some embodiments, the user selection of the at least one option among the one or more options to configure the one or more SASE-based network services may comprise user selection of one of implementing the one or more SASE-based network services in a self-managed manner in which agents of the entity manage operation of the one or more SASE-based network services, implementing the one or more SASE-based network services in a co-managed manner in which agents of the service provider and agents of the entity co-manage operation of the one or more SASE-based network services, or implementing the one or more SASE-based network services in a pro-managed manner in which agents of the service provider manage operation of the one or more SASE-based network services, or the like.

In some embodiments, the method may further comprise providing, using the computing system and via the UX platform, one or more options for the user to manage SASE-based network services, the one or more options to manage SASE-based network services comprising at least one of: one or more options to change at least one of deployment, configuration, settings, location, or operation of at least one SASE-based network service among the one or more SASE-based network services; one or more options to provide, update, or customize at least one of configuration information or policies for one or more of deployment, configuration, or operation of at least one SASE-based network service among the one or more SASE-based network services; one or more options to view at least one of one or more metrics, one or more operations, one or more overviews, one or more summaries, one or more reports, one or more performance alerts, one or more trouble tickets, one or more insights, or one or more dashboard features associated with at least one SASE-based network service among the one or more SASE-based network services; one or more options to view at least one of a dashboard or a network map that presents an overlay of SASE-based network services being deployed on devices associated with the entity, regardless of platform or third party service providers that provide the SASE-based network services over the one or more second networks; one or more options to provide the user with curated access to one or more platforms or one or more portals of third party service providers that provide SASE-based network services over the one or more second networks; or one or more options to purchase and configure additional SASE-based network services; and/or the like. In some instances, the one or more options to purchase and configure additional SASE-based network services may comprise at least one of: options to purchase one or more tokens, the one or more tokens providing the user with future options to convert tokens into one or more of SASE-based network services, CPEs, or other devices; options to convert previously purchased tokens into one or more of SASE-based network services, CPEs, or other devices; options to purchase one or more of SASE-based network services, CPEs, or other devices, options to configure each of the one or more of SASE-based network services, CPEs, or other devices, options to select one or more locations for deploying each of the one or more of SASE-based network services, CPEs, or other devices and options to deploy each of the one or more of SASE-based network services, CPEs, or other devices at the selected one or more locations; or options to purchase one or more of SASE-based network services, CPEs, or other devices, without selecting locations for deployment of the one or more of SASE-based network services, CPEs, or other devices; and/or the like.

According to some embodiments, the one or more options to configure the one or more SASE-based network services may comprise a plurality of sets of options, each set of options being displayed on a page among a plurality of pages within the customer portal, wherein selection of each set of options and input to advance to a next set of options may cause configuration of the one or more SASE-based network services to be performed in real-time or near-real-time based on the set of options that are selected prior to advancement to the next set of options.

In some embodiments, the method may further comprise collecting, using the computing system, network usage data from the one or more CPE, and autonomously orchestrating configuration of the one or more SASE-based network services may be further performed based at least in part on analysis of the collected network usage data to optimize the one or more SASE-based network services.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: provide a user experience ("UX") platform for a customer portal, the UX platform being accessible by a user via a user device over one or more first networks; provide, via the UX platform, one or more options to configure, via the customer portal, one or more secure access service edge ("SASE")-based network services among a plurality of network services provided by a service provider, the one or more SASE-based network services collectively comprising a set of unified, cloud-based services that integrate software-defined wide area network ("SD-WAN") functionalities with network service functionalities and network security functionalities; and autonomously orchestrate deployment and configuration of the one or more SASE-based network services via one or more customer premises equipment ("CPE") that are associated with the user or to an entity with which the user is associated, over one or more second networks, based at least in part on user selection of at least one option among the one or more options to configure the one or more SASE-based network services.

According to some embodiments, the computing system may comprise at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like.

In yet another aspect, a method may comprise autonomously orchestrating, using a secure access service edge ("SASE") manager, deployment and configuration of one or more SASE-based network services via one or more customer premises equipment ("CPE") that are associated with a user or to an entity with which the user is associated, over one or more networks, based at least in part on user selection of at least one option among one or more options to configure the one or more SASE-based network services, the one or more SASE-based network services collectively comprising a set of unified, cloud-based services that integrate software-defined wide area network ("SD-WAN") functionalities with network service functionalities and network security functionalities.

In some embodiments, each of the one or more CPE may be located at a customer premises, the customer premises comprising one of a residential customer premises, a business customer premises, a corporate customer premises, an enterprise customer premises, an education facility customer premises, a medical facility customer premises, or a governmental customer premises, and/or the like.

According to some embodiments, the plurality of network services may comprise at least one of the one or more SASE-based network services, a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may comprise at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some cases, the network security functionalities may comprise at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like.

In some embodiments, the method may further comprise in response to receiving user input or user request, performing, using the SASE manager, at least one of: changing at least one of deployment, configuration, settings, location, or operation of at least one SASE-based network service among the one or more SASE-based network services; implementing one or more of deployment, configuration, or operation of at least one SASE-based network service among the one or more SASE-based network services based at least in part on at least one of configuration information or policies that have been provided, updated, or customized by the user; displaying, in a user interface, at least one of one or more metrics, one or more operations, one or more overviews, one or more summaries, one or more reports, one or more performance alerts, one or more trouble tickets, one or more insights, or one or more dashboard features associated with at least one SASE-based network service among the one or more SASE-based network services; displaying, in the user interface, at least one of a dashboard or a network map that presents an overlay of SASE-based network services being deployed on devices associated with the entity, regardless of platform or third party service providers that provide the SASE-based network services over the one or more second networks; or providing the user with curated access, in the user interface, to one or more platforms or one or more portals of third party service providers that provide SASE-based network services over the one or more second networks; and/or the like.

According to some embodiments, the method may further comprise collecting, using the SASE manager, network usage data from the one or more CPE, and autonomously orchestrating configuration of the one or more SASE-based network services may be further performed based at least in part on analysis of the collected network usage data to optimize the one or more SASE-based network services.

In still another aspect, a method may comprise providing, using a computing system, a user experience ("UX") platform for a customer portal, the UX platform being accessible by a user via a user device over one or more first networks; providing, using the computing system and via the UX platform, one or more options to purchase, via the customer portal, secure access service edge ("SASE")-based network services among a plurality of network services provided by a service provider, the SASE-based network services collectively comprising a set of unified, cloud-based services that integrate software-defined wide area network ("SD-WAN") functionalities with network service functionalities and network security functionalities; and providing, using the computing system and via the UX platform, one or more options to preconfigure, via the customer portal, any purchased SASE-based network services. The method may further comprise, in response to an order being initiated by the user and in response to receiving a first user selection of at least one option to purchase one or more SASE-based network services and a second user selection of at least one option to preconfigure the one or more SASE-based network services, autonomously orchestrating, using the computing system, deployment and configuration of the one or more SASE-based network services via one or more customer premises equipment ("CPE") that are associated with the user or to an entity with which the user is associated, over one or more second networks, based at least in part on the second user selection.

In another aspect, an apparatus may comprise at least one processor and a non-transitory computer readable medium communicatively coupled to the at least one processor. The non-transitory computer readable medium may have stored thereon computer software comprising a set of instructions that, when executed by the at least one processor, causes the apparatus to: provide a user experience ("UX") platform for a customer portal, the UX platform being accessible by a user via a user device over one or more first networks; provide, via the UX platform, one or more options to purchase, via the customer portal, secure access service edge ("SASE")-based network services among a plurality of network services provided by a service provider, the SASE-based network services collectively comprising a set of unified, cloud-based services that integrate software-defined wide area network ("SD-WAN") functionalities with network service functionalities and network security functionalities; provide, via the UX platform, one or more options to preconfigure, via the customer portal, any purchased SASE-based network services; and in response to an order being initiated by the user and in response to receiving a first user selection of at least one option to purchase one or more SASE-based network services and a second user selection of at least one option to preconfigure the one or more SASE-based network services, autonomously orchestrate deployment and configuration of the one or more SASE-based network services via one or more customer premises equipment ("CPE") that are associated with the user or to an entity with which the user is associated, over one or more second networks, based at least in part on the second user selection.

In some embodiments, the apparatus may comprise at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing network service ordering and provisioning of secure access service edge ("SASE") services or software packages, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

FIG. 1 is a schematic diagram illustrating a system 100 for implementing a customer portal for providing a user experience ("UX") for customers to order and configure secure access service edge ("SASE")-based network services or software packages that are subsequently autonomously provisioned via a network(s) and autonomously configured, in accordance with various embodiments.

In the non-limiting embodiment of FIG. 1, system 100 may comprise computing system 105, database(s) 110, customer portal 115a, network service provisioning system 120, IT platform services 125, and network service monitoring system 130a, each associated with a service provider 135. In some embodiments, disposed within customer premises 140a-140n (collectively, "customer premises 140" or the like), each associated with a customer or user, may be one or more user devices 145a-145n and/or 150a-150n (collectively, "user devices 145 and/or 150" or the like), each communicatively coupled to one of gateway devices 155a-155n (collectively, "gateway devices 155" or the like; which may include customer premises equipment ("CPE") or universal CPE ("uCPE"), or the like). System 100 may further comprise one or more edge nodes 160 disposed in one or more networks 165, which may be operated or provided by service provider 135 or a different service provider (not shown).

According to some embodiments, alternative or additional to customer portal 115a, system 100 may (further) comprise customer portal 115b disposed within network(s) 170, which may be associated with a different service provider compared with the service provider 135 and/or the service provider for operating or providing the one or more networks 165.

In some embodiments, system 100 may further comprise one or more third parties 175a-175n, each with corresponding third party server(s) 180 (including third party server(s) 180a-180n, or the like) and corresponding database(s) 185 (including database(s) 185a-185n, or the like). The third parties 175a-175n may provide software applications or other services for customers to purchase on the customer portal 115a and/or 115b.

According to some embodiments, network(s) 165 and/or 170 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 165 and/or 170 may include an access network of the service provider (e.g., an Internet service provider ("ISP")). In another embodiment, the network(s) 165 and/or 170 may include a core network of the service provider and/or the Internet.

System 100 may further comprise one or more secure access service edge ("SASE")-based network services 190, the one or more SASE-based network services 190 collectively comprising a set of unified, cloud-based services that integrate software-defined wide area network ("SD-WAN") functionalities with network service functionalities and network security functionalities.

In some embodiments, the computing system 105 may include, without limitation, at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like. In some instances, the plurality of network services may include, but is not limited to, at least one of the one or more SASE-based network services 190, a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may include, without limitation, at least one of WAN optimization functionalities, software-defined application-centric network control functionalities, data loss prevention ("DLP") functionalities (which may be used to inspect data sent via messaging applications, in motion over the network, in use on a managed endpoint device, and/or at rest in on-premises file servers or in cloud applications and cloud storage, or the like), application performance management ("APM") functionalities (which may be used to identify application performance issues and/or to maintain an expected level of service, or the like), bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities may include, but are not limited to, at least one of firewall as a service ("FWaaS") functionalities (which may provide virtualized firewall services in the cloud, or the like), secure web gateway ("SWG") functionalities (which may provide secure access to popular SaaS and web service, or the like), zero-trust network access ("ZTNA") functionalities (which may provide network access for work from anywhere security implementation, or the like), anti-malware functionalities, intrusion detection functionalities (which may be used to monitor network events and to analyze them for signs of incidents, violations, and/or threats to customer security policies, or the like), intrusion prevention functionalities (which may be used to detect incidents and to stop detected incidents, or the like), cloud access security broker ("CASB") functionalities (which may be used to address permissions and use for cloud applications, or the like), remote browser isolation ("RBI") functionalities (which may be used to separate a device from Internet browsing by hosting and running all browsing activity in a remote cloud-based container to isolate data, or the like), web application and application programming interface ("API") protection ("WAAP") functionalities (which may be specifically designed to protect web applications and APIs, or the like), secure sockets layer ("SSL") or transport layer security ("TLS") inspection functionalities (which may be used to intercept and review encrypted Internet communication between a client and a server, or the like), or network-based threat detection functionalities, and/or the like.

In various embodiments, the one or more SASE-based network services utilize SD-WAN functionalities to achieve optimal WAN management by providing optimized network routing, optimized WAN and network security, optimized network connectivity, and optimized remote network access, in some cases, by using the software-defined nature of SD-WAN, which allows for immediate, real-time or near-real-time, changes in configuration of the SD-WAN without need for truck rolls or deployment of technicians, or the like. In some instances, FWaaS functionalities provide customized or customizable deployment of firewalls, thereby providing scalability and elasticity, while extending full network security throughout the network and/or to locations within the network as needed. In some cases, SWG functionalities may include, but are not limited to, filtering unwanted software or malware from user-initiated network traffic and enforcing corporate and regulatory policy compliance, and/or the like, in some cases, by utilizing at least one of uniform resource locator ("URL") filtering, malicious-code detection and filtering, application controls for popular Web-based applications (e.g., instant messaging ("IM") and Skype, or the like), native data leak prevention, or integrated data leak prevention, and/or the like. In some instances, ZTNA functionalities enable dynamic adjustment of application or network service access by requiring verification of users' identities and establishment of device trust before providing users with access to authorized applications and/or network services, thereby preventing unauthorized access, containing potential breaches, and/or limiting lateral access within the network by malicious entities, and/or the like. In some instances, ZTNA functionalities may be based on such factors as user identify, location, device type, and/or the like. In some cases, CASB functionalities utilize either on-premises or cloud-based security policy enforcement points that are located between the users and network service providers, and are configured to combine and interject security policies (e.g., enterprise security policies) as network-based or cloud-based resources are accessed by the users. CASB functionalities may include consolidating multiple types of security policy enforcement, including, but not limited to, at least one of authentication, single sign-on, authorization, credential mapping, device profiling, encryption, tokenization, logging, alerting, malware detection, or malware prevention, and/or the like. The one or more SASE-based network services—which are elastic, self-healing, and self-maintaining, and/or the like—may utilize unified management of these and other disparate network-based services, products, and/or functionalities, thereby enabling users to monitor and manage all network and security solutions from a single interface or portal (sometimes referred to as "a single pane of glass" or the like), in contrast with the traditionally delivered siloed point solutions that fail to integrate the disparate network and security solutions. In this manner, cost and complexity (in terms of network and security) may be reduced, centralized orchestration and real-time application optimization may be achieved, seamless access (including more secure remote and mobile access) for users may be provided, access may be restricted based on user, device, and/or application identity, consistent security policy may be applied to improve overall network security, and/or centralized management may be used to increase effectiveness of network and security staff, and/or the like.

In operation, the computing system 105, customer portal 115a and/or 115b, network service provisioning 120, IT platform services 125, network service monitoring 130a and/or 130b (collectively, "computing system" or the like) may perform methods for providing a UX for customers to order and configure SASE-based network services that are subsequently autonomously provisioned via a network(s) and autonomously configured, in some cases, autonomously deploying, on CPE or gateway device(s) 155, purchased SASE-based network services that have been preconfigured and/or subsequently configuring such network services, as described in detail with respect to FIGS. 2-4, and/or configuring such network services either before installation of the CPE or after installation of the CPE.

These and other functions of the system 100 (and its components) are described in greater detail below with respect to FIGS. 2-4.

Figure 2:
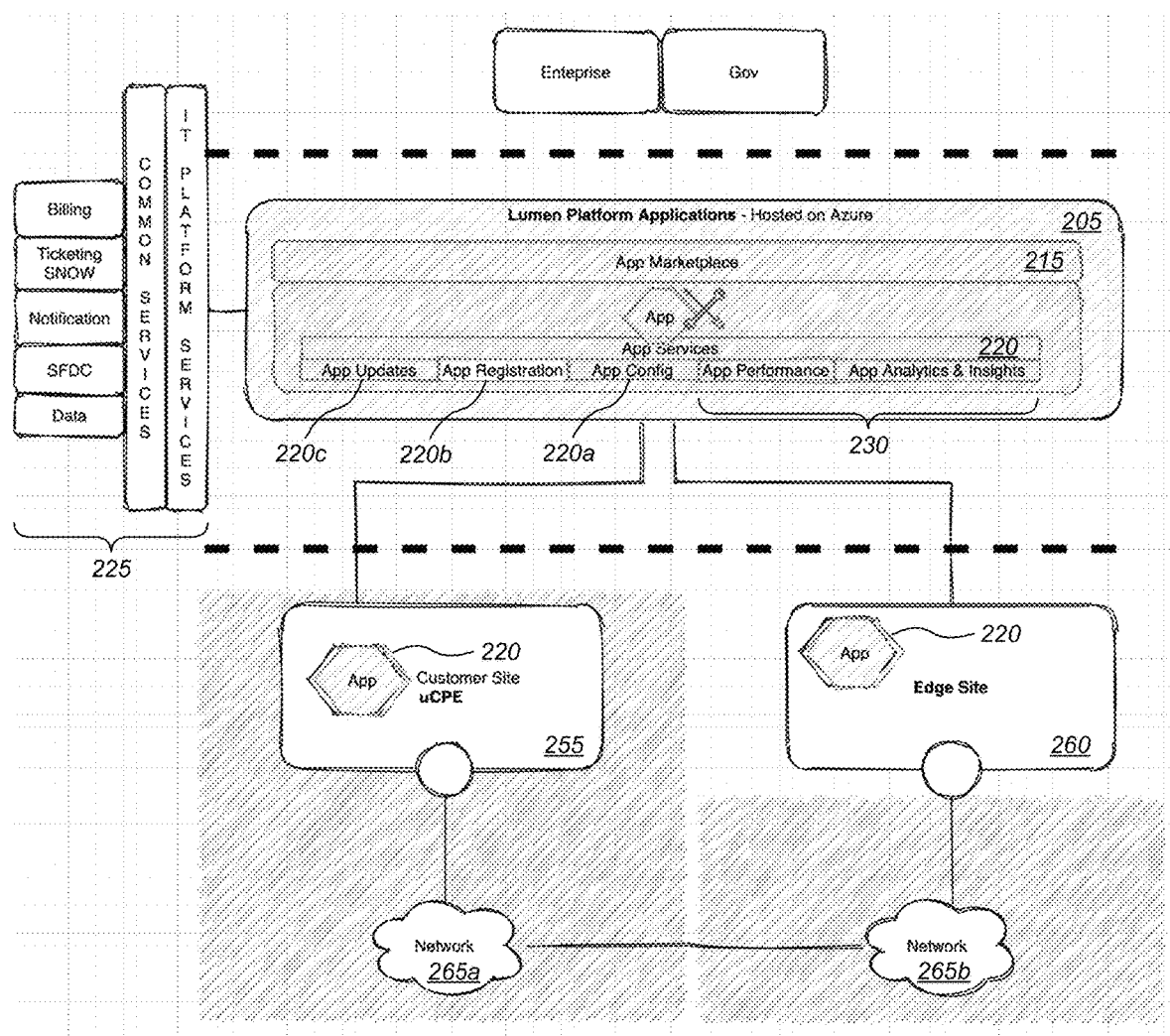
FIG. 2 is a schematic diagram illustrating a system for implementing a digital marketplace for providing a UX for customers to order and configure SASE-based network services that are subsequently autonomously provisioned via a network(s) and autonomously configured, in accordance with various embodiments.

FIG. 2 is a schematic diagram illustrating a system 200 for implementing a digital marketplace for providing a UX for customers to order and configure SASE-based network services that are subsequently autonomously provisioned via a network(s) and autonomously configured, in accordance with various embodiments. In some embodiments, network services may be embodied by network service software applications ("apps"), in some cases, SASE-based network service apps, or the like.

System 200 may comprise service provider platform applications or systems 205, digital marketplace 215, one or more app services 220, IT platform services 225 (including, but not limited to, common services, including, without limitation, billing services, ticketing services, notifications, SFDC systems, data systems, and/or the like), app performance and/or analytics and insights systems 230, uCPE (or customer premises) 255, edge node(s) (or edge node location) 260, and network(s) 265a-265b, and/or the like. In some cases, the app services 220 may include at least one of app configuration 220a, app registration 220b, and/or app updates 220c, and/or the like.

In some embodiments, service provider platform applications or systems 205, digital marketplace 215, IT platform services 225, app performance and/or analytics and insights systems 230, uCPE (or customer premises) 255, edge node(s) (or edge node location) 260, and network(s) 265a-265b of system 200 of FIG. 2 may correspond to computing system 105, customer portal 115a or 115b, IT platform services system 125, network service monitoring system 130a or 130b, gateway device 155a-155n (or customer premises 140a-140n), edge node(s) 160, and network(s) 165 and/or 170 of system 100 of FIG. 1, respectively, and the descriptions of these components of system 100 are applicable to the corresponding components of system 200, respectively.

These and other functions of the system 200 (and its components) are described in greater detail below with respect to FIGS. 1, 3, and 4.

Figure 3:
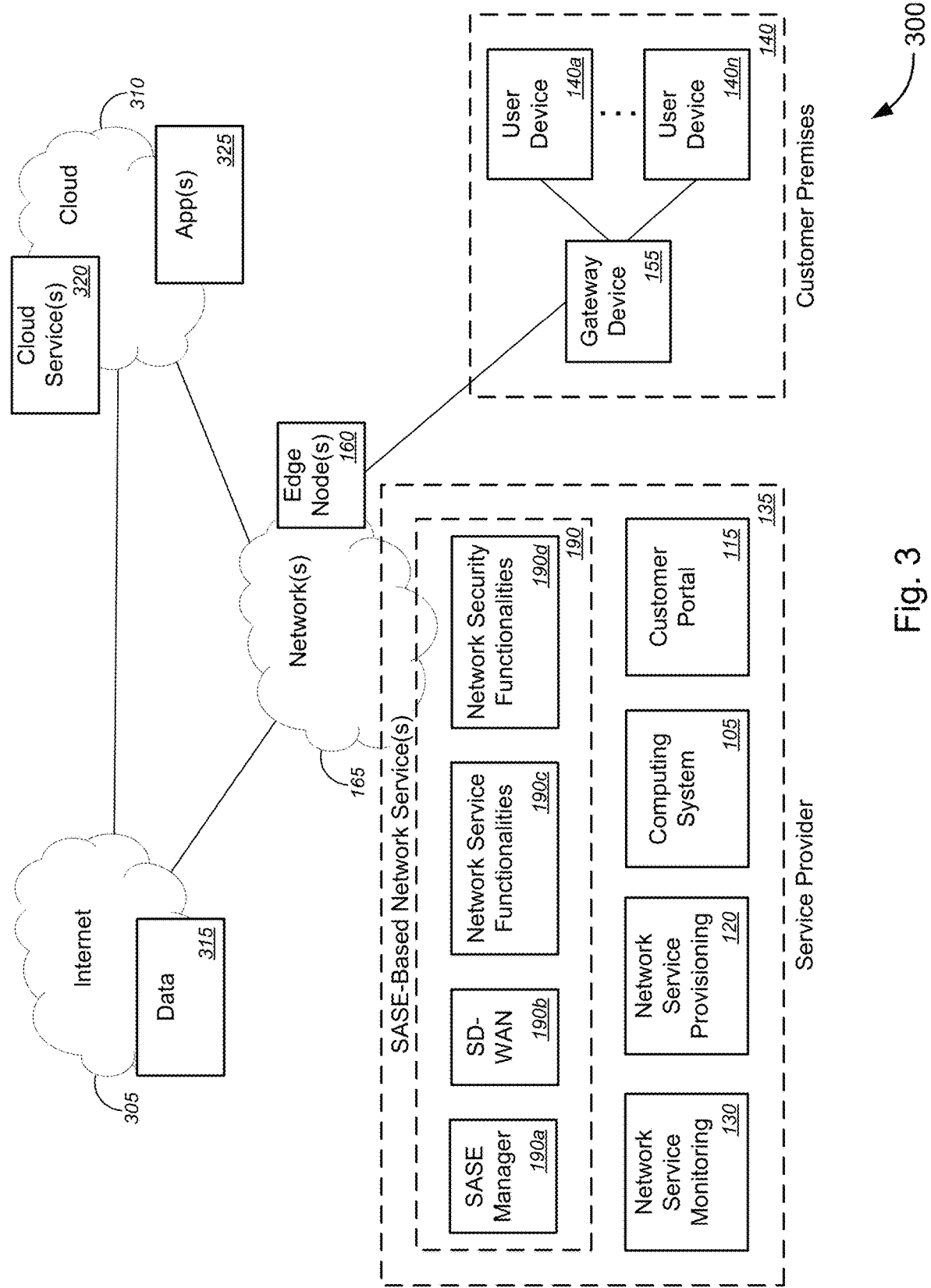
FIG. 3 is a schematic diagram illustrating a non-limiting example of provisioning and configuring SASE-based network services, in accordance with various embodiments.

FIG. 3 is a schematic diagram illustrating a non-limiting example 300 of provisioning and configuring SASE-based network services, in accordance with various embodiments.

Referring to the non-limiting example 300 of FIG. 3, SASE-based network service(s) 190 may include a SASE manager 190a, and the SASE-based network service(s) 190 may be associated with a service provider 135 may collectively comprise a set of unified, cloud-based services that integrate software-defined wide area network ("SD-WAN") functionalities 190b with network service functionalities 190c and network security functionalities 190d. In some cases, the network service functionalities 190b may include, without limitation, at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities 190c may include, but are not limited to, at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like. The one or more SASE-based network services 190—which are elastic, self-healing, and self-maintaining, and/or the like—may utilize unified management of these and other disparate network-based services, products, and/or functionalities to provide the users with secure access to data 315, cloud services 320, and software applications ("apps") 325 over the Internet 305 and/or the cloud 310, thereby enabling users to monitor and manage all network and security solutions from a single interface or portal (sometimes referred to as "a single pane of glass" or the like), in contrast with the traditionally delivered siloed point solutions that fail to integrate the disparate network and security solutions.

As described herein with respect to FIGS. 1, 2, and 4, the computing system 105, customer portal 115, network service provisioning 120, network service monitoring system 130 (collectively, "computing system" or the like) may perform methods for providing a UX for customers to order and configure SASE-based network services that are subsequently autonomously provisioned via a network(s) (e.g., networks 165, 305, and 310, or the like, and/or edge node(s) 160, or the like) and autonomously configured, in some cases, autonomously deploying, on CPE or gateway device(s) 155, purchased SASE-based network services that have been preconfigured and/or subsequently configuring such network services, as described in detail with respect to FIGS. 1, 2, and 4.

In some aspects, SASE manager 190a may autonomously orchestrate deployment and configuration of one or more SASE-based network services via one or more CPE that are associated with a user or to an entity with which the user is associated, over one or more networks, based at least in part on user selection of at least one option among one or more options to configure the one or more SASE-based network services.

In some embodiments, in response to receiving user input or user request, the SASE manager 190a may perform at least one of: changing at least one of deployment, configuration, settings, location, or operation of at least one SASE-based network service among the one or more SASE-based network services; implementing one or more of deployment, configuration, or operation of at least one SASE-based network service among the one or more SASE-based network services based at least in part on at least one of configuration information or policies that have been provided, updated, or customized by the user; displaying, in a user interface, at least one of one or more metrics, one or more operations, one or more overviews, one or more summaries, one or more reports, one or more performance alerts, one or more trouble tickets, one or more insights, or one or more dashboard features associated with at least one SASE-based network service among the one or more SASE-based network services; displaying, in the user interface, at least one of a dashboard or a network map that presents an overlay of SASE-based network services being deployed on devices associated with the entity, regardless of platform or third party service providers (or vendors) that provide the SASE-based network services over the one or more second networks [e.g., in a cross vendor, cross platform dashboard that presents an overlay of existing services, irrespective of vendor or platform, or the like]; or providing the user with curated access, in the user interface, to one or more platforms or one or more portals of third party service providers (or vendors) that provide SASE-based network services over the one or more second networks; and/or the like. For the latter two functionalities, the service provider acts as a managed services provider that manages the services provided by the third party vendors, and, in accordance with the various embodiments herein, is able to provide a common platform to manage an integrated display interface for disparate systems provided by the service provider and each of the third party vendors.

According to some embodiments, SASE manager 190a may collect network usage data from the one or more CPE, and autonomously orchestrating configuration of the one or more SASE-based network services may be further performed based at least in part on analysis of the collected network usage data to optimize the one or more SASE-based network services.

Figure 4A:
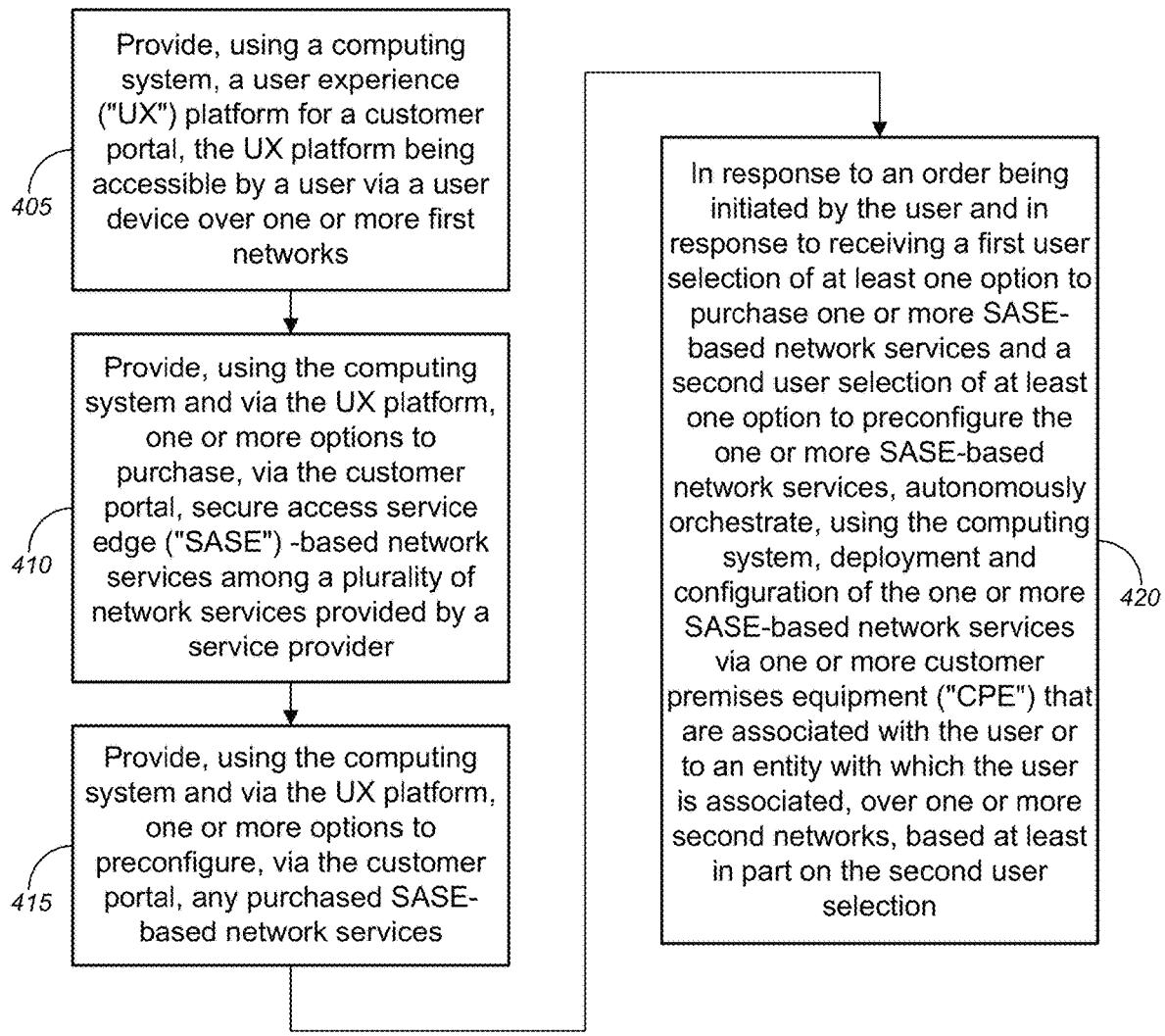
FIGS. 4A-4C are flow diagrams illustrating a method for implementing a customer portal for providing a UX for customers to order and configure SASE-based network services or software packages that are subsequently autonomously provisioned via a network(s) and autonomously configured, in accordance with various embodiments.
Figure 4B:
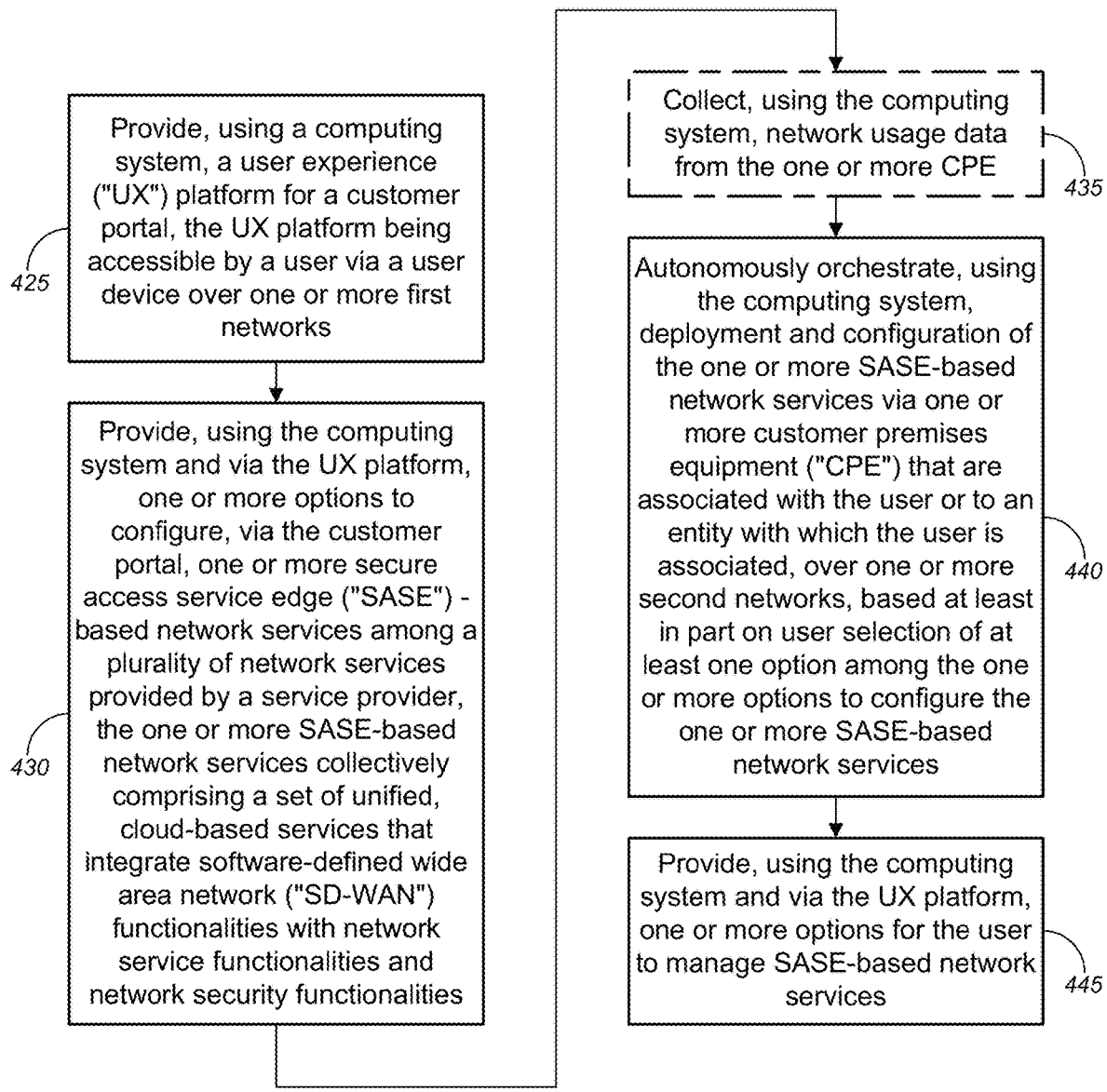
Figure 4C:
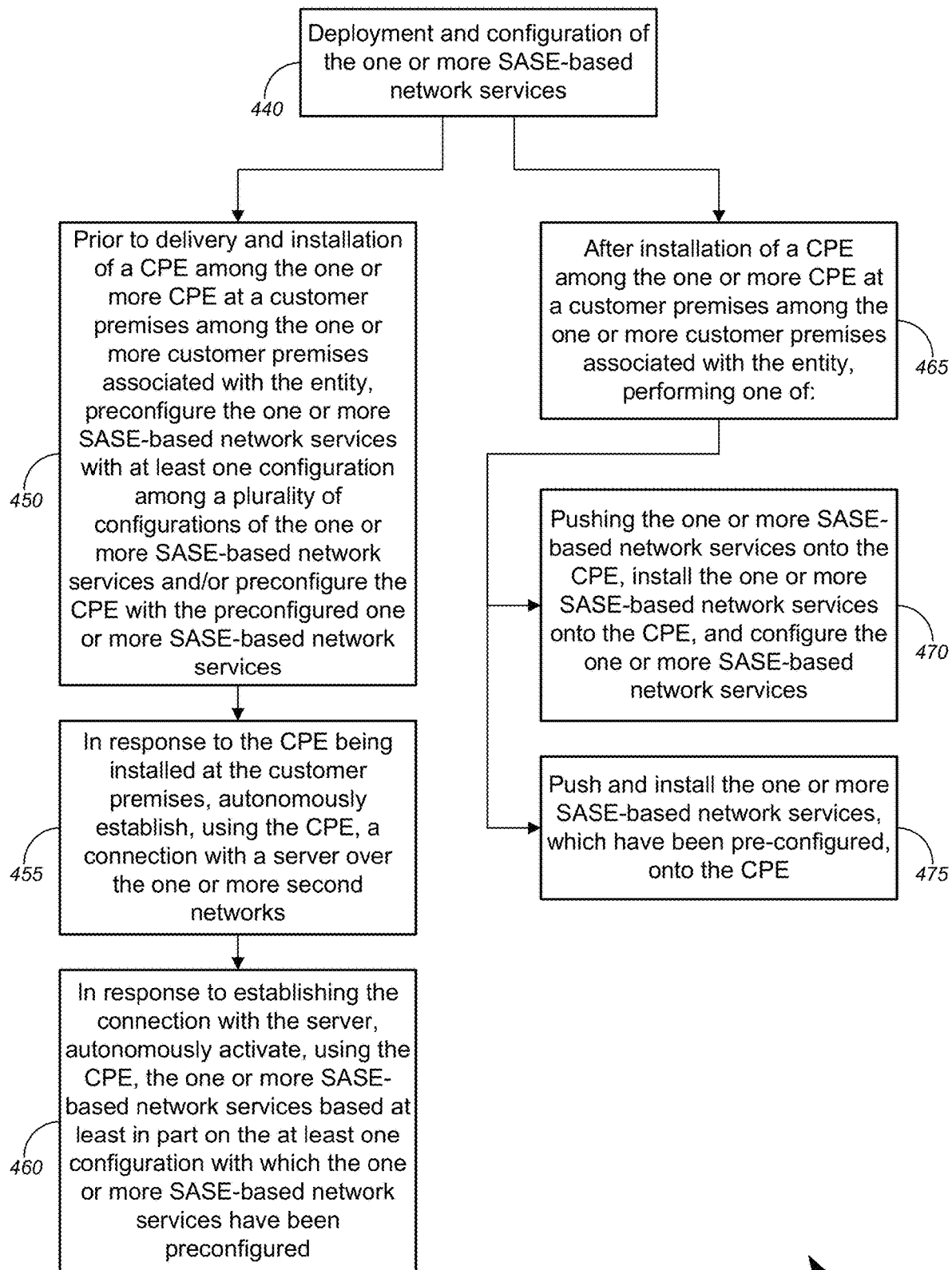

FIGS. 4A-4C (collectively, "FIG. 4") are flow diagrams illustrating a method 400 for implementing a customer portal for providing a UX for customers to order and configure SASE-based network services or software packages that are subsequently autonomously provisioned via a network(s) and autonomously configured, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, may comprise providing, using a computing system, a user experience ("UX") platform for a customer portal, the UX platform being accessible by a user via a user device over one or more first networks. At block 410, method 400 may comprise providing, using the computing system and via the UX platform, one or more options to purchase, via the customer portal, secure access service edge ("SASE")-based network services among a plurality of network services provided by a service provider, the SASE-based network services collectively comprising a set of unified, cloud-based services that integrate software-defined wide area network ("SD-WAN") functionalities with network service functionalities and network security functionalities. Method 400 may further comprise, at block 415, providing, using the computing system and via the UX platform, one or more options to preconfigure, via the customer portal, any purchased SASE-based network services.

In some embodiments, the computing system may include, without limitation, at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like. In some instances, the plurality of network services may include, but is not limited to, at least one of the one or more SASE-based network services, a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may include, without limitation, at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities may include, but are not limited to, at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like.

Method may further comprise, in response to an order being initiated by the user and in response to receiving a first user selection of at least one option to purchase one or more SASE-based network services and a second user selection of at least one option to preconfigure the one or more SASE-based network services, autonomously orchestrating, using the computing system, deployment and configuration of the one or more SASE-based network services via one or more customer premises equipment ("CPE") that are associated with the user or to an entity with which the user is associated, over one or more second networks, based at least in part on the second user selection (block 420). In some cases, each of the one or more CPE may be located at a customer premises, the customer premises comprising one of a residential customer premises, a business customer premises, a corporate customer premises, an enterprise customer premises, an education facility customer premises, a medical facility customer premises, or a governmental customer premises, and/or the like. In some instances, at least one of the one or more second networks may be the same network as at least one of the one or more first networks.

Alternatively, or additionally, with reference to FIGS. 4B and 4C, method 400 may comprise providing, using a computing system, a UX platform for a customer portal, the UX platform being accessible by a user via a user device over one or more first networks (block 425); providing, using the computing system and via the UX platform, one or more options to configure, via the customer portal, one or more SASE-based network services among a plurality of network services provided by a service provider, the one or more SASE-based network services collectively comprising a set of unified, cloud-based services that integrate SD-WAN functionalities with network service functionalities and network security functionalities (block 430); collecting, using the computing system, network usage data from the one or more CPE (optional block 435); autonomously orchestrating, using the computing system, deployment and configuration of the one or more SASE-based network services via one or more CPE that are associated with the user or to an entity with which the user is associated, over one or more second networks, based at least in part on user selection of at least one option among the one or more options to configure the one or more SASE-based network services (block 440); and providing, using the computing system and via the UX platform, one or more options for the user to manage SASE-based network services (block 445). In some cases, autonomously orchestrating configuration of the one or more SASE-based network services may be further performed based at least in part on analysis of the collected network usage data (if any are collected) to optimize the one or more SASE-based network services.

In some instances, the one or more options to manage SASE-based network services may include, without limitation, at least one of: one or more options to change at least one of deployment, configuration, settings, location, or operation of at least one SASE-based network service among the one or more SASE-based network services; one or more options to provide, update, or customize at least one of configuration information or policies for one or more of deployment, configuration, or operation of at least one SASE-based network service among the one or more SASE-based network services; one or more options to view at least one of one or more metrics, one or more operations, one or more overviews, one or more summaries, one or more reports, one or more performance alerts, one or more trouble tickets, one or more insights, or one or more dashboard features associated with at least one SASE-based network service among the one or more SASE-based network services; one or more options to view at least one of a dashboard or a network map that presents an overlay of SASE-based network services being deployed on devices associated with the entity, regardless of platform or third party service providers that provide the SASE-based network services over the one or more second networks; one or more options to provide the user with curated access to one or more platforms or one or more portals of third party service providers that provide SASE-based network services over the one or more second networks; or one or more options to purchase and configure additional SASE-based network services; and/or the like. In some instances, the one or more options to purchase and configure additional SASE-based network services may comprise at least one of: options to purchase one or more tokens, the one or more tokens providing the user with future options to convert tokens into one or more of SASE-based network services, CPEs, or other devices; options to convert previously purchased tokens into one or more of SASE-based network services, CPEs, or other devices; options to purchase one or more of SASE-based network services, CPEs, or other devices, options to configure each of the one or more of SASE-based network services, CPEs, or other devices, options to select one or more locations for deploying each of the one or more of SASE-based network services, CPEs, or other devices and options to deploy each of the one or more of SASE-based network services, CPEs, or other devices at the selected one or more locations; or options to purchase one or more of SASE-based network services, CPEs, or other devices, without selecting locations for deployment of the one or more of SASE-based network services, CPEs, or other devices; and/or the like.

In some embodiments, the computing system may include, without limitation, at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like. In some cases, each of the one or more CPE may be located at a customer premises, the customer premises including, but not limited to, one of a residential customer premises, a business customer premises, a corporate customer premises, an enterprise customer premises, an education facility customer premises, a medical facility customer premises, or a governmental customer premises, and/or the like. In some instances, at least one of the one or more second networks may be the same network as at least one of the one or more first networks. Alternatively, the one or more first networks and the one or more second networks may be different networks.

According to some embodiments, the plurality of network services may include, but is not limited to, at least one of the one or more SASE-based network services, a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may include, without limitation, at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities may include, but are not limited to, at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like.

In some embodiments, the user selection of the at least one option among the one or more options to configure the one or more SASE-based network services may comprise user selection of one of the following differentiated service wrappers: implementing the one or more SASE-based network services in a self-managed manner in which agents of the entity manage operation of the one or more SASE-based network services, implementing the one or more SASE-based network services in a co-managed manner in which agents of the service provider and agents of the entity co-manage operation of the one or more SASE-based network services, or implementing the one or more SASE-based network services in a pro-managed manner in which agents of the service provider manage operation of the one or more SASE-based network services, or the like. For a non-limiting example of a self-managed service wrapper, a customer with its own IT staff or wanting a do-it-yourself ("DIY") model deployment may complete their own policy changes and updates, and may use standard or default tools within the SASE-based network services for monitoring or streaming events to their own tools. For a non-limiting example of a co-managed service wrapper, a customer may desire help from the service provide to complete initial configurations, may desire standard policy support from the service provider, and/or may desire standardized event notifications from the service provider, while responding to events and/or notifications on their own. For a non-limiting example of a pro-managed service wrapper, a customer may desire ongoing configuration management and support from the service provider, may need customized event notifications from the service provider, and/or may expect proactive response to at least some notifications from the service provider, and/or the like. These examples are merely illustrative, and the co-managed service wrapper may span the spectrum between self-managed and pro-managed in terms of which functions and tasks are handled by the service provider and which by the customer.

According to some embodiments, the one or more options to configure the one or more SASE-based network services may include, without limitation, a plurality of sets of options, each set of options being displayed on a page among a plurality of pages within the customer portal, wherein selection of each set of options and input to advance to a next set of options may cause configuration of the one or more SASE-based network services to be performed in real-time or near-real-time based on the set of options that are selected prior to advancement to the next set of options.

With reference to FIG. 4C, in some embodiments, the user selection of the at least one option among the one or more options to configure the one or more SASE-based network services may comprise user selection of one or more first options to preconfigure the one or more SASE-based network services with at least one configuration among a plurality of configurations of the one or more SASE-based network services and/or to preconfigure the one or more CPE with the preconfigured one or more SASE-based network services, each prior to delivery and/or installation of the one or more CPE at one or more customer premises associated with the entity. In such cases, deployment and configuration of the one or more SASE-based network services (at block 440) may comprise: prior to delivery and installation of a CPE among the one or more CPE at a customer premises among the one or more customer premises associated with the entity, preconfiguring the one or more SASE-based network services with at least one configuration among a plurality of configurations of the one or more SASE-based network services and/or preconfiguring the CPE with the preconfigured one or more SASE-based network services (block 450); in response to the CPE being installed at the customer premises, autonomously establishing, using the CPE, a connection with a server over the one or more second networks (block 455); and in response to establishing the connection with the server, autonomously activating, using the CPE, the one or more SASE-based network services based at least in part on the at least one configuration with which the one or more SASE-based network services have been preconfigured (block 460).

Alternatively, the user selection of the at least one option among the one or more options to configure the one or more SASE-based network services may comprise user selection of one or more second options to configure the one or more SASE-based network services with at least one configuration among a plurality of configurations of the one or more SASE-based network services and/or to configure the one or more CPE with the one or more SASE-based network services, each after the one or more CPE have already been installed at one or more customer premises associated with the entity. In such cases, deployment and configuration of the one or more SASE-based network services (at block 440) may comprise, after installation of a CPE among the one or more CPE at a customer premises among the one or more customer premises associated with the entity (block 465), performing one of: pushing the one or more SASE-based network services onto the CPE, installing the one or more SASE-based network services onto the CPE, and configuring the one or more SASE-based network services (block 470); or pushing and installing the one or more SASE-based network services, which have been pre-configured, onto the CPE (block 475); or the like.

Exemplary System and Hardware Implementation

Figure 5:
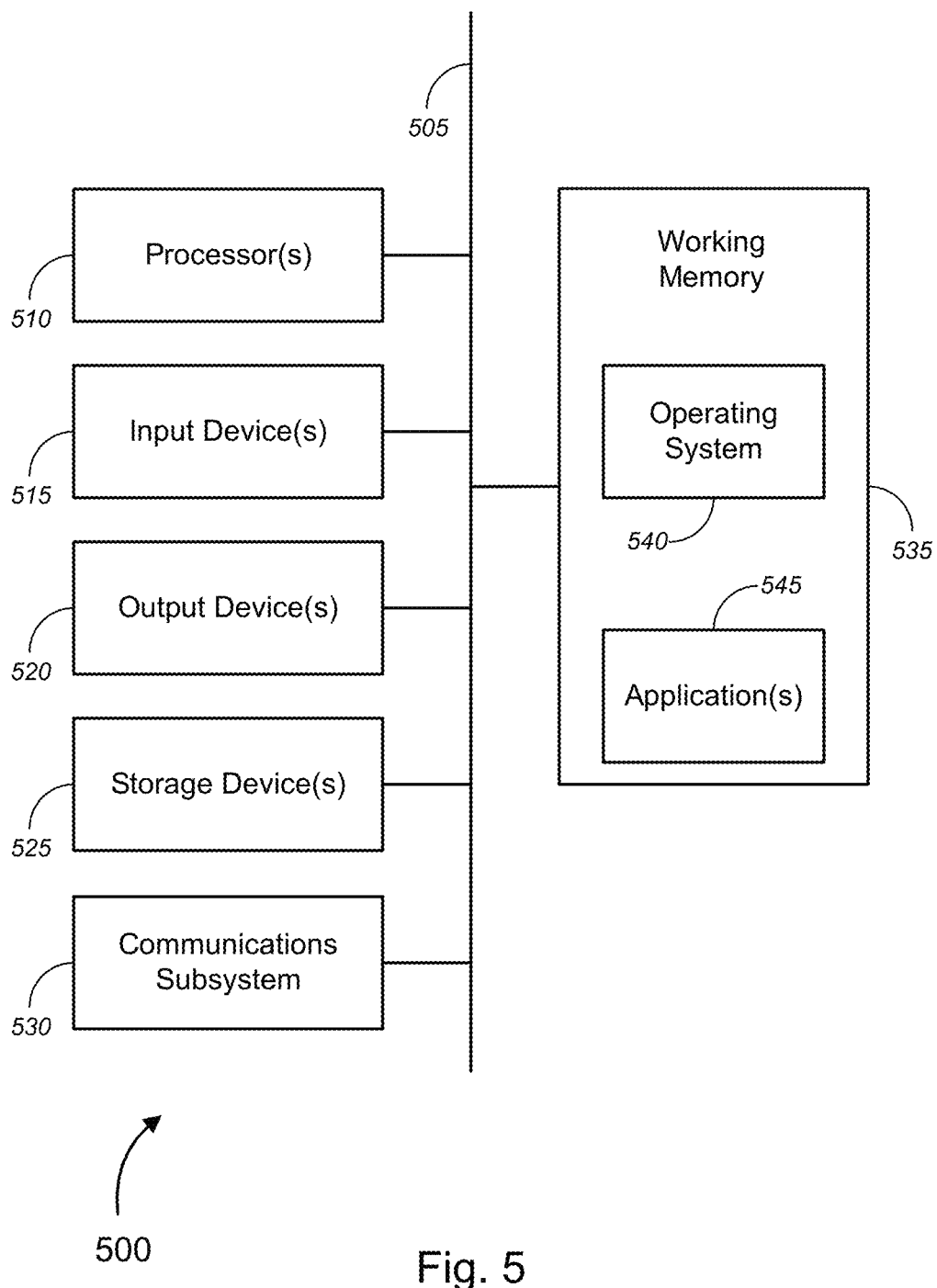
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system or system platform 105 or 205, customer portal 115a, 115b, 115, or 215, network service provisioning system 120, IT platform services system 125 or 225, network service monitoring system 130a, 130b, 130, or 230, user devices 145a-145n and 150a-150n, gateway device or CPE 155a-155n, 155, or 255, and edge nodes 160 and 260, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system or system platform 105 or 205, customer portal 115a, 115b, 115, or 215, network service provisioning system 120, IT platform services system 125 or 225, network service monitoring system 130a, 130b, 130, or 230, user devices 145a-145n and 150a-150n, gateway device or CPE 155a-155n, 155, or 255, and edge nodes 160 and 260, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
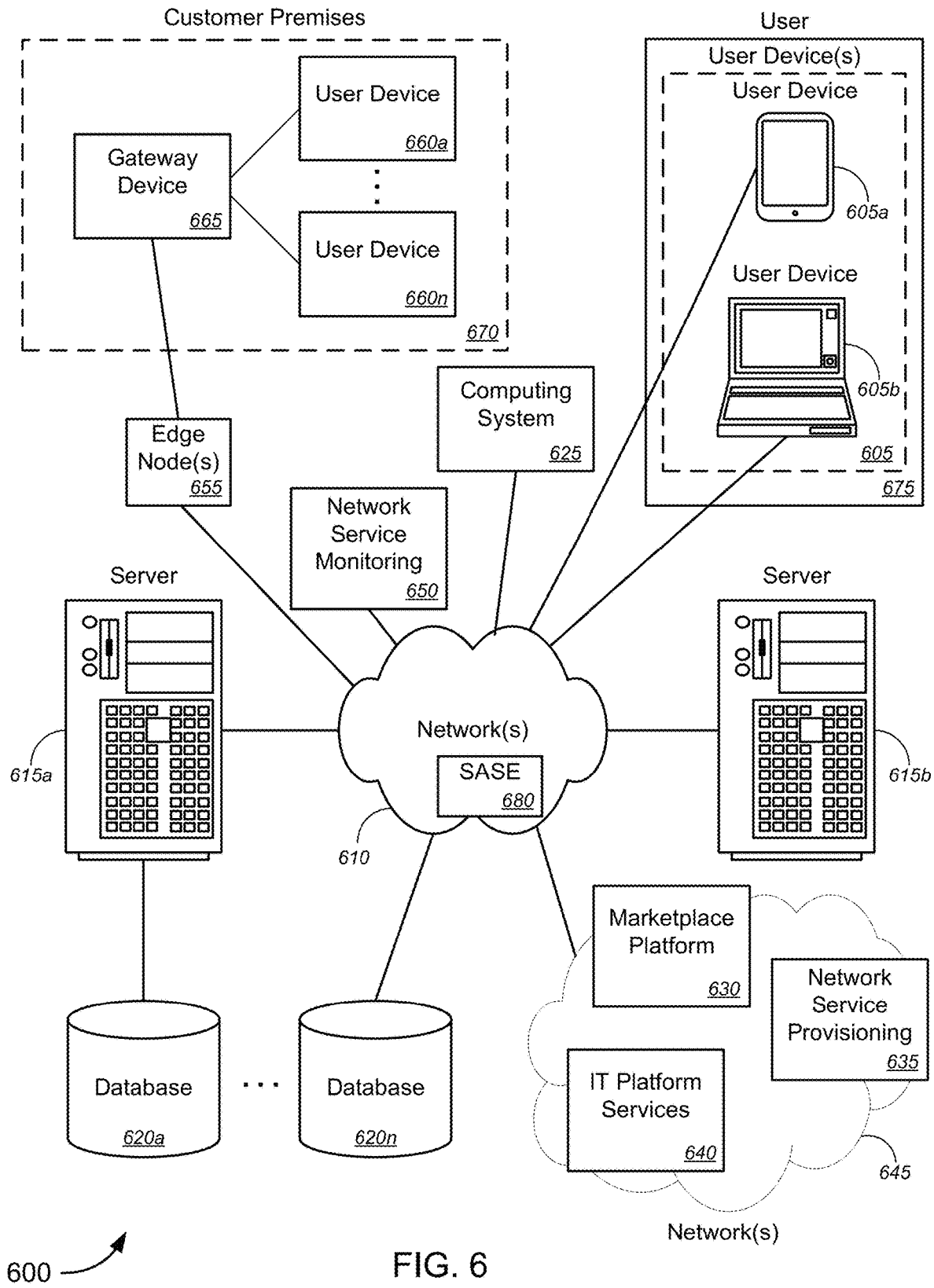
FIG. 6 is a block diagram illustrating a networked system of computers, computing systems, or system hardware architecture, which can be used in accordance with various embodiments.

As noted above, a set of embodiments comprises methods and systems for implementing network service ordering and provisioning of secure access service edge ("SASE") services or software packages. FIG. 6 illustrates a schematic diagram of a system 600 that can be used in accordance with one set of embodiments. The system 600 can include one or more user computers, user devices, or customer devices 605.

A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™' AppleTalk™, and the like. Merely by way of example, the network(s) 610 (similar to network(s) 165 or 170 of FIG. 1, network(s) 265a or 265b of FIG. 2, or network(s) 165, 305, and 310 of FIG. 3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing network service ordering and provisioning of secure access service edge ("SASE") services or software packages, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing system or system platform 105 and 205 of FIGS. 1 and 2, or the like), a marketplace platform 630 (similar to marketplace platform 115*a*, 115*b*, and 215 of FIGS. 1 and 2, or the like), a network service provisioning system 635 (similar to network service provisioning system 120 of FIG. 1, or the like), an IT platform services system 640 (similar to IT platform services system 125 and 225 of FIGS. 1 and 2, or the like), and a network(s) 645. In some cases, the marketplace platform 630, the network service provisioning system 635, and the IT platform services system 640 may be disposed within network(s) 645, which may communicatively couple with network(s) 610. System 600 may further comprise a network service monitoring system 650 (similar to network service monitoring system 130*a*, 130*b*, and 230 of FIGS. 1 and 2, or the like) and an edge node(s) 655 (similar to edge nodes 160 and 260 of FIGS. 1 and 2, or the like), each of which may be disposed within or communicatively couple with network(s) 610. System 600 may further comprise one or more user devices 660*a*-660*n* (collectively, "user devices 660" or the like; similar to user devices 145*a*-145*n* and 150*a*-150*n* of FIGS. 1 and 2, or the like) and gateway device 665 (similar to gateway devices or CPE 155*a*-155*n* and 255 of FIGS. 1 and 2, or the like), each disposed within customer premises 670 (similar to customer premises 140*a*-140*n* of FIG. 1, or the like). System 600 may further comprise SASE-based network services 680 (similar to SASE-based network services 190 and 390 of FIGS. 1 and 3, or the like).

The functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

providing, using a computing system, a user experience ("UX") platform for a customer portal, the UX platform being accessible by a user via a user device over one or more first networks;

providing, using the computing system and via the UX platform, one or more options to configure, via the customer portal, one or more secure access service edge ("SASE")-based network services among a plurality of network services provided by a service provider, the one or more SASE-based network services collectively comprising a set of unified, cloud-based services that integrate software-defined wide area network ("SD-WAN") functionalities with network service functionalities and network security functionalities; and autonomously orchestrating, using the computing system, deployment and configuration of the one or more SASE-based network services via one or more customer premises equipment ("CPE") that are associated with the user or to an entity with which the user is associated, over one or more second networks, based at least in part on user selection of at least one option among the one or more options to configure the one or more SASE-based network services, wherein deployment and configuration of the one or more SASE-based network services comprises:

prior to delivery and installation of a CPE among the one or more CPE at a customer premises, preconfiguring the one or more SASE-based network services with at least one configuration among a plurality of configurations of the one or more SASE-based network services and preconfiguring the CPE with the preconfigured one or more SASE-based network services;

in response to the CPE being installed at the customer premises, autonomously establishing, using the CPE, a connection with a server over the one or more second networks; and in response to establishing the connection with the server, autonomously activating, using the CPE, the one or more SASE-based network services based at least in part on the at least one configuration with which the one or more SASE-based network services have been preconfigured, and wherein the one or more options to configure the one or more SASE-based network services comprise a plurality of sets of options, each set of options being displayed on a page among a plurality of pages within the customer portal, wherein selection of each set of options and input to advance to a next set of options cause configuration of the one or more SASE-based network services to be performed in real-time based on the set of options that are selected prior to advancement to the next set of options.

2. The method of claim 1, wherein the computing system comprises at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, wherein each of the one or more CPE are located at a customer premises, the customer premises comprising one of a residential customer premises, a business customer premises, a corporate customer premises, an enterprise customer premises, an education facility customer premises, a medical facility customer premises, or a governmental customer premises.

3. The method of claim 1, wherein at least one of the one or more second networks is the same network as at least one of the one or more first networks.

4. The method of claim 1, wherein the plurality of network services comprises at least one of the one or more SASE-based network services, a plurality of network service software applications ("apps"), one or more Internet services, one or more WAN services, one or more SD-WAN services, one or more network security services, one or more telephony services, one or more voice over Internet Protocol ("VoIP") services, or other network services, wherein the network service functionalities comprise at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, wherein the network security functionalities comprise at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities.

5. The method of claim 1, wherein the user selection of the at least one option among the one or more options to configure the one or more SASE-based network services comprises user selection of one or more first options to preconfigure the one or more SASE-based network services with at least one configuration among a plurality of configurations of the one or more SASE-based network services and/or to preconfigure the one or more CPE with the preconfigured one or more SASE-based network services, each prior to delivery and/or installation of the one or more CPE at the customer premises.

6. The method of claim 1, wherein the user selection of the at least one option among the one or more options to configure the one or more SASE-based network services comprises user selection of one or more second options to configure the one or more SASE-based network services with at least one configuration among a plurality of configurations of the one or more SASE-based network services and/or to configure the one or more CPE with the one or more SASE-based network services, each after the one or more CPE have already been installed at one or more customer premises associated with the entity.

7. The method of claim 1, wherein the user selection of the at least one option among the one or more options to configure the one or more SASE-based network services comprises user selection of one of implementing the one or more SASE-based network services in a self-managed manner in which agents of the entity manage operation of the one or more SASE-based network services, implementing the one or more SASE-based network services in a co-managed manner in which agents of the service provider and agents of the entity co-manage operation of the one or more SASE-based network services, or implementing the one or more SASE-based network services in a pro-managed manner in which agents of the service provider manage operation of the one or more SASE-based network services.

8. The method of claim 1, further comprising:
providing, using the computing system and via the UX platform, one or more options for the user to manage SASE-based network services, the one or more options to manage SASE-based network services comprising at least one of:
one or more options to change at least one of deployment, configuration, settings, location, or operation of at least one SASE-based network service among the one or more SASE-based network services;
one or more options to provide, update, or customize at least one of configuration information or policies for one or more of deployment, configuration, or operation of at least one SASE-based network service among the one or more SASE-based network services;
one or more options to view at least one of one or more metrics, one or more operations, one or more overviews, one or more summaries, one or more reports, one or more performance alerts, one or more trouble tickets, one or more insights, or one or more dashboard features associated with at least one SASE-based network service among the one or more SASE-based network services;
one or more options to view at least one of a dashboard or a network map that presents an overlay of SASE-based network services being deployed on devices associated with the entity, regardless of platform or third party service providers that provide the SASE-based network services over the one or more second networks;
one or more options to provide the user with curated access to one or more platforms or one or more portals of third party service providers that provide SASE-based network services over the one or more second networks; or
one or more options to purchase and configure additional SASE-based network services.

9. The method of claim 8, wherein the one or more options to purchase and configure additional SASE-based network services comprise at least one of:
options to purchase one or more tokens, the one or more tokens providing the user with future options to convert tokens into one or more of SASE-based network services, CPEs, or other devices;
options to convert previously purchased tokens into one or more of SASE-based network services, CPEs, or other devices;

options to purchase one or more of SASE-based network services, CPEs, or other devices, options to configure each of the one or more of SASE-based network services, CPEs, or other devices, options to select one or more locations for deploying each of the one or more of SASE-based network services, CPEs, or other devices and options to deploy each of the one or more of SASE-based network services, CPEs, or other devices at the selected one or more locations; or options to purchase one or more of SASE-based network services, CPEs, or other devices, without selecting locations for deployment of the one or more of SASE-based network services, CPEs, or other devices.

10. The method of claim 1, further comprising:

collecting, using the computing system, network usage data from the one or more CPE;

wherein autonomously orchestrating configuration of the one or more SASE-based network services is further performed based at least in part on analysis of the collected network usage data to optimize the one or more SASE-based network services.

11. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

provide a user experience ("UX") platform for a customer portal, the UX platform being accessible by a user via a user device over one or more first networks;

provide, via the UX platform, one or more options to configure, via the customer portal, one or more secure access service edge ("SASE")-based network services among a plurality of network services provided by a service provider, the one or more SASE-based network services collectively comprising a set of unified, cloud-based services that integrate software-defined wide area network ("SD-WAN") functionalities with network service functionalities and network security functionalities; and autonomously orchestrate deployment and configuration of the one or more SASE-based network services via one or more customer premises equipment ("CPE") that are associated with the user or to an entity with which the user is associated, over one or more second networks, based at least in part on user selection of at least one option among the one or more options to configure the one or more SASE-based network services, wherein deployment and configuration of the one or more SASE-based network services comprises:

prior to delivery and installation of a CPE among the one or more CPE at a customer premises, preconfiguring the one or more SASE-based network services with at least one configuration among a plurality of configurations of the one or more SASE-based network services and preconfiguring the CPE with the preconfigured one or more SASE-based network services;

in response to the CPE being installed at the customer premises, autonomously establishing, using the CPE, a connection with a server over the one or more second networks; and in response to establishing the connection with the server, autonomously activating, using the CPE, the one or more SASE-based network services based at least in part on the at least one configuration with which the one or more SASE-based network services have been preconfigured, and wherein the one or more options to configure the one or more SASE-based network services comprise a plurality of sets of options, each set of options being displayed on a page among a plurality of pages within the customer portal, wherein selection of each set of options and input to advance to a next set of options cause configuration of the one or more SASE-based network services to be performed in real-time based on the set of options that are selected prior to advancement to the next set of options.

12. The system of claim 11, wherein the computing system comprises at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system.

13. A method, comprising:

providing a user experience ("UX") platform for a customer portal, the UX platform being accessible by a user via a user device over one or more networks; and autonomously orchestrating, using a secure access service edge ("SASE") manager, deployment and configuration of one or more SASE-based network services via one or more customer premises equipment ("CPE") that are associated with the user or to an entity with which the user is associated, over the one or more networks, based at least in part on user selection of at least one option among one or more options to configure, via the customer portal, the one or more SASE-based network services, the one or more SASE-based network services collectively comprising a set of unified, cloud-based services that integrate software-defined wide area network ("SD-WAN") functionalities with network service functionalities and network security functionalities, wherein deployment and configuration of the one or more SASE-based network services comprises:

prior to delivery and installation of a CPE among the one or more CPE at a customer premises, preconfiguring the one or more SASE-based network services with at least one configuration among a plurality of configurations of the one or more SASE-based network services and preconfiguring the CPE with the preconfigured one or more SASE-based network services;

in response to the CPE being installed at the customer premises, autonomously establishing, using the CPE, a connection with a server over the one or more networks; and in response to establishing the connection with the server, autonomously activating, using the CPE, the one or more SASE-based network services based at least in part on the at least one configuration with which the one or more SASE-based network services have been preconfigured, and wherein the one or more options to configure the one or more SASE-based network services comprise a plurality of sets of options, each set of options being displayed on a page among a plurality of pages within the customer portal, wherein selection of each set of options and input to advance to a next set of options cause configuration of the one or more SASE-based network services to be performed in real-time based on the set of options that are selected prior to advancement to the next set of options.

14. The method of claim 13, wherein each of the one or more CPE are located at a customer premises, the customer premises comprising one of a residential customer premises, a business customer premises, a corporate customer premises, an enterprise customer premises, an education facility customer premises, a medical facility customer premises, or a governmental customer premises.

15. The method of claim 13, wherein the plurality of network services comprises at least one of the one or more SASE-based network services, a plurality of network service software applications ("apps"), one or more Internet services, one or more WAN services, one or more SD-WAN services, one or more network security services, one or more telephony services, one or more voice over Internet Protocol ("VoIP") services, or other network services, wherein the network service functionalities comprise at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, wherein the network security functionalities comprise at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities.

16. The method of claim 13, further comprising:
in response to receiving user input or user request, performing, using the SASE manager, at least one of:
changing at least one of deployment, configuration, settings, location, or operation of at least one SASE-based network service among the one or more SASE-based network services;
implementing one or more of deployment, configuration, or operation of at least one SASE-based network service among the one or more SASE-based network services based at least in part on at least one of configuration information or policies that have been provided, updated, or customized by the user;
displaying, in a user interface, at least one of one or more metrics, one or more operations, one or more overviews, one or more summaries, one or more reports, one or more performance alerts, one or more trouble tickets, one or more insights, or one or more dashboard features associated with at least one SASE-based network service among the one or more SASE-based network services;
displaying, in the user interface, at least one of a dashboard or a network map that presents an overlay of SASE-based network services being deployed on devices associated with the entity, regardless of platform or third party service providers that provide the SASE-based network services over one or more second networks; or
providing the user with curated access, in the user interface, to one or more platforms or one or more portals of third party service providers that provide SASE-based network services over the one or more second networks.

17. The method of claim 13, further comprising:
collecting, using the SASE manager, network usage data from the one or more CPE;
wherein autonomously orchestrating configuration of the one or more SASE-based network services is further performed based at least in part on analysis of the collected network usage data to optimize the one or more SASE-based network services.

* * * * *